United States Patent
Andrivon et al.

(10) Patent No.: US 11,388,447 B2
(45) Date of Patent: Jul. 12, 2022

(54) METHOD AND APPARATUS FOR PROCESSING A MEDIUM DYNAMIC RANGE VIDEO SIGNAL IN SL-HDR2 FORMAT

(71) Applicant: InterDigital VC Holdings, Inc., Wilmington, DE (US)

(72) Inventors: Pierre Andrivon, Liffre (FR); Patrick Lopez, Livre sur Changeon (FR); Marie-Jean Colaitis, Cesson-Sevigne (FR); David Touze, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/261,658

(22) PCT Filed: Jul. 11, 2019

(86) PCT No.: PCT/US2019/041275
§ 371 (c)(1),
(2) Date: Jan. 20, 2021

(87) PCT Pub. No.: WO2020/018331
PCT Pub. Date: Jan. 23, 2020

(65) Prior Publication Data
US 2021/0266608 A1    Aug. 26, 2021

(30) Foreign Application Priority Data

Jul. 20, 2018  (EP) .................................... 18305993

(51) Int. Cl.
*H04N 19/98*    (2014.01)
*H04N 19/70*    (2014.01)
(Continued)

(52) U.S. Cl.
CPC ............. *H04N 19/98* (2014.11); *H04N 19/70* (2014.11)

(58) Field of Classification Search
None
See application file for complete search history.

(56) References Cited

U.S. PATENT DOCUMENTS

2017/0180759 A1 *  6/2017  Mertens ................. H04N 19/70
2021/0051344 A1 *  2/2021  Talstra ..................... G09G 5/10

FOREIGN PATENT DOCUMENTS

WO    WO 2016020189 A1    2/2016

OTHER PUBLICATIONS

Diaz et al., "Integrating HEVC Video Compression with a High Dynamic Range Video Pipeline", SMPTE Motion Imaging Journal, vol. 125, No. 1, Jan. 2016, pp. 14-21.
(Continued)

*Primary Examiner* — Christopher Braniff
(74) *Attorney, Agent, or Firm* — Condo Roccia Koptiw LLP

(57) ABSTRACT

A medium dynamic range video signal and associated metadata are received, wherein the metadata include data representative of a peak luminance value of the signal. The medium dynamic range video signal is processed in a first mode to reconstruct a high dynamic range video signal based on a received standard dynamic range video signal and associated metadata if the peak luminance value of the medium dynamic range video signal is smaller than the peak luminance value of a presentation display, and in a second mode to optimize a received high dynamic range video signal for a rendering device if the peak luminance value of the medium dynamic range video signal is greater than the peak luminance value of the presentation display.

19 Claims, 10 Drawing Sheets

(51) Int. Cl.
G06T 5/00 (2006.01)
H04N 19/186 (2014.01)

(56) References Cited

OTHER PUBLICATIONS

Anonymous, "High-Performance Single Layer High Dynamic Range (HDR) System for use in Consumer Electronics devices; Part 1: Directly Standard Dynamic Range (SDR) Compatible HDR System (SL-HDR1)", European Telecommunications Standards Institute (ETSI), ETSI TS 103 433-1 V1.2.1 Technical Specification, Aug. 2017, 123 pages.

Anonymous, "High-Performance Single Layer High Dynamic Range (HDR) System for use in Consumer Electronics devices; Part 1: Directly Standard Dynamic Range (SDR) Compatible HDR System (SL-HDR1)", European Telecommunications Standards Institute (ETSI), Draft ETSI TS 103 433-1 V1.1.6 Technical Specification, Jun. 2017, 124 pages.

Anonymous, "Advanced Video Coding for Generic Audiovisual Services—Series H: Audiovisual and Multimedia Systems—Infrastructure of Audiovisual Services—Coding of moving video", Telecommunication Standardization Sector of ITU, Recommendation ITU-T H.264, Apr. 2017, 812 pages.

Anonymous, "High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2)", ETSI and European Broadcasting Union, ETSI TS 103 433-2 V1.1.1, Jan. 2018, 45 pages.

Anonymous, "Dynamic Metadata for Color Volume Transform—Application #2", The Society of Motion Picture and Television Engineers, SMPTE Standard, SMPTE ST 2094-20:2016, Jul. 6, 2016, 23 pages.

Anonymous, "High Dynamic Range Electro-Optical Transfer Function of Mastering Reference Displays", Society of Motion Picture and Television Engineers, SMPTE ST 2084:2014. Aug. 16, 2014, pp. 1-14.

Anonymous, "Mastering Display Color Volume Metadata Supporting High Luminance and Wide Color Gamut Images", Society of Motion Picture Television Engineers (SMPTE) Standard, SMPTE ST 2086:2014, Oct. 13, 2014, pp. 1-6.

Anonymous, "High Dynamic Range Television for Production and International Programme Exchange", International Telecommunication Union, Radiocommunication Sector of ITU, Report ITU-R BT.2390-4, Apr. 2018, 51 pages.

Anonymous, "High Efficiency Video Coding", Telecommunication Standardization Sector of ITU, Series H: Audiovisual and Multimedia Systems, Infrastructure of audiovisual services—Coding of moving video, Recommendation ITU-T H.265, Feb. 2018, 692 pages.

Anonymous, "Image Parameter Values for High Dynamic Range Television for Use in Production and International Programme Exchange", International Telecommunication Union, Radiocommunication Sector of ITU, Recommendation ITU-R BT.2100-2, Jul. 2018, 15 pages.

Anonymous, "A DTV Profile for Uncompressed High-Speed Digital Interfaces: CTA-861-G", Consumer Technology Association, CTA Technology & Standards Department, Nov. 2016, 218 pages.

ITU-R, "Image Parameter Values for High Dynamic Range Television for Use in Production and International Programme Exchange", Recommendation ITU-R BT.2100-1, BT Series, Broadcasting Service (Television), Geneva, Jun. 2017, 16 pages.

ITU-R, "Parameter Values for the HDTV Standards for Production and International Programme Exchange", Recommendation ITU-R BT.709-6, BT Series, Broadcasting Service (Television), Geneva, Jun. 2015, 19 pages.

ITU-R et al., "Parameter Values for Ultra-High Definition Television Systems for Production and International Programme Exchange", Recommendation ITU-R BT.2020-2, BT Series, Broadcasting Service (Television), Geneva, Oct. 2015, 8 pages.

SMPTE, "Dynamic Metadata for Color Volume Transform—Application #3", SMPTE ST 2094-30:2016, SMPTE Standard, The Society of Motion Picture and Television Engineers, Jul. 6, 2016, 15 pages.

Wang et al., "Overview of the Second Generation AVS Video Coding Standard (AVS2)", ZTE Communications, vol. 14, No. 1, Feb. 2016, pp. 3-11.

* cited by examiner

METHOD AND APPARATUS FOR PROCESSING A MEDIUM DYNAMIC RANGE VIDEO SIGNAL IN SL-HDR2 FORMAT

This application claims the benefit, under 35 U.S.C. § 365 of International Application PCT/US2019/041275, filed Jul. 11, 2019, which was published in accordance with PCT Article 21(2) on Jan. 23, 2020, in English, and which claims the benefit of European Patent Application No. 18305993.0, filed Jul. 20, 2018.

FIELD

The present principles relate to distributing HDR video signals of medium peak luminance.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, image data refer to one or several arrays of samples (pixel values) in a specific image/video format which specifies all information relative to the pixel values of an image (or a video) and all information which may be used by a display and/or any other apparatus to visualize and/or decode an image (or video) for example. An image comprises a first component, in the shape of a first array of samples, usually representative of luminance (or luma) of the image, and a second and third component, in the shape of other arrays of samples, usually representative of the chrominance (or chroma) of the image. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a dynamic range of the pixel values.

Standard Dynamic Range images (SDR images) are images whose luminance values are represented with a limited number of bits (typically 8). This limited representation does not allow correct rendering of small signal variations, in particular in dark and bright luminance ranges. In High Dynamic Range images (HDR images), the signal representation is extended to maintain a high accuracy of the signal over its entire range. In HDR images, pixel values are usually represented in floating-point format (typically at least 10 bits per component, namely float or half-float), the most popular format being openEXR half-float format (16-bit per RGB component, i.e. 48 bits per pixel) or in integers with a long representation, typically at least 16 bits.

The advent of the High Efficiency Video Coding (HEVC) standard (ITU-T H.265 Telecommunication standardization sector of ITU (02/2018), series H: audiovisual and multimedia systems, infrastructure of audiovisual services—coding of moving video, High efficiency video coding, Recommendation ITU-T H.265) enables the deployment of new video services with enhanced viewing experience, such as Ultra HD services. In addition to an increased spatial resolution, the Ultra HD format can bring a wider color gamut (WCG) and a higher dynamic range (HDR) than the Standard Color Gamut (SCG) and the Standard Dynamic Range (SDR), respectively, of the High Definition format currently deployed. Different solutions for the representation and coding of HDR/WCG video have been proposed such as the perceptual transfer function based Perceptual Quantizer (PQ) (SMPTE ST 2084, "High Dynamic Range Electro-Optical Transfer Function of Mastering Reference Displays", Society of Motion Picture and Television Engineers, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21). Typically, SMPTE ST 2084 allows to represent HDR video signal of up to 10 000 $cd/m^2$ peak luminance with only 10 or 12 bits.

SDR backward compatibility with decoding and rendering apparatus is an important feature in some video distribution systems, such as broadcasting or multicasting systems. A solution based on a single layer coding/decoding process may be backward compatible, e.g. SDR compatible, and may leverage legacy distribution networks and services already in place.

Such a single layer based distribution solution enables both high quality HDR rendering on HDR-enabled Consumer Electronic (CE) devices, while also offering high quality SDR rendering on SDR-enabled CE devices. Such a solution is based on an encoded signal, e.g. SDR signal, and associated metadata (few bytes per video frame or scene) that can be used to reconstruct another signal, e.g. either SDR or HDR signal, from a decoded signal.

An example of a single layer based distribution solution may be found in the ETSI technical specification TS 103 433-1 V1.2.1 (August 2017). Such a single layer based distribution solution is denoted SL-HDR1 in the following.

Additionally, HDR distribution systems (workflows but also decoding and rendering apparatus) may be already deployed. Indeed, there are a number of global video services providers which include HDR content. However, distributed HDR material may be represented in a format or with characteristics which do not match consumer end-device characteristics. Usually, the consumer end-device adapts the decoded material to its own characteristics. However, the versatility of technologies employed in the HDR TV begets important differences in terms of rendition because of the differences between the consumer end-device characteristics compared to the mastering display used in the production environment to grade the original content. For content producer, artistic intent fidelity and its rendition to the consumer are of utmost importance. Thus, "display adaptation" metadata generated either at the production stage during grading process or under the control of a quality check operator before emission enable the conveyance of the artistic intent to the consumer when the decoded signal is to be adapted to end-device characteristics.

An example of a single layer based distribution solution combined with display adaptation may be found in ETSI technical specification TS 103 433-2 V1.1.1 (January 2018). Such a single layer based distribution solution is denoted SL-HDR2 in the following.

Such single layer based distribution solution, SL-HDR1 or SL-HDR2, generates metadata as parameters used for the reconstruction of the signal. Metadata may be either static or dynamic.

Static metadata means parameters representative of the video content or its format that remain the same for a video (set of images) and/or a program.

Static metadata are valid for the whole video content (scene, movie, clip . . . ) and may depend on the image content per se or the representation format of the image content. They may define, for example, the image format or color space or color gamut, respectively. For instance, SMPTE ST 2086:2014, "Mastering Display Color Volume Metadata Supporting High Luminance and Wide Color Gamut Images" define such a kind of static metadata which describe the mastering display used to grade the material in a production environment. The Mastering Display Colour Volume (MDCV) SEI (Supplemental Enhanced Information) message is used for the distribution of ST 2086 for both H.264/AVC ("Advanced video coding for generic audiovisual Services", SERIES H: AUDIOVISUAL AND MULTIMEDIA SYSTEMS, Recommendation ITU-T H.264, Telecommunication Standardization Sector of ITU, April 2017) and HEVC video codecs.

Dynamic metadata is content-dependent information, so that metadata could change with the image/video content, e.g. for each image or for each group of images. As an example, SMPTE ST 2094:2016 standards families, "Dynamic Metadata for Color Volume Transform" are dynamic metadata typically generated in a production environment. SMPTE ST 2094-30 can be distributed along HEVC and AVC coded video stream thanks to the Colour Remapping Information (CRI) SEI message.

There are pay TV operators interested in Medium Dynamic Range broadcasting. Basically, it consists in transmitting an HDR video of medium peak luminance. Consumer displays with higher peak luminance, up-map the signal while those with lower peak luminance down-map the signal. SL-HDR2 can operate MDR distribution however the current up-mapping feature rests upon extrapolation while the distributed MDR signal comes from a down-mapped original HDR signal (with higher peak luminance).

The present embodiments have been devised with the foregoing in mind.

SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

According to an aspect of the present disclosure, a method for processing a video signal is disclosed. Such a method comprises:

receiving a medium dynamic range video signal and associated metadata, said metadata including data representative of a peak luminance value of the medium dynamic range video signal;

receiving data representative of a peak luminance value of a presentation display;

determining whether the peak luminance value of the medium dynamic range video signal is greater or lower than the peak luminance value of the presentation display;

configuring a processor based on the determination, wherein the processor has a first mode to reconstruct a high dynamic range video signal based on a received standard dynamic range video signal and associated metadata, and a second mode to optimize a received high dynamic range video signal for the rendering device; and processing the medium dynamic range video signal by the processor in the first mode if the peak luminance value of the medium dynamic range video signal is smaller than the peak luminance value of the presentation display and in the second mode if the peak luminance value of the medium dynamic range video signal is greater than the peak luminance value of the presentation display.

According to another aspect of the present disclosure, a processor for processing a video signal is disclosed, wherein the processor has a first mode to reconstruct a high dynamic range video signal based on a received standard dynamic range video signal and associated metadata, and a second mode to optimize a received high dynamic range video signal for the rendering device. Such a processor comprises:

means for receiving a medium dynamic range video signal and associated metadata, said metadata including data representative of a peak luminance value of the medium dynamic range video signal;

means for receiving data representative of a peak luminance value of a presentation display;

means for determining whether the peak luminance value of the medium dynamic range video signal is greater or lower than the peak luminance value of the presentation display; and means for processing the medium dynamic range video signal in the first mode if the peak luminance value of the medium dynamic range video signal is smaller than the peak luminance value of the presentation display and in the second mode if the peak luminance value of the medium dynamic range video signal is greater than the peak luminance value of the presentation display.

The present disclosure also provides an apparatus comprising a processor according to the preceding description. The present embodiments also provide a computer program product including instructions, which, when executed by a computer, cause the computer to carry out the methods described.

The specific nature of the present principles as well as other objects, advantages, features and uses of the present principles will become evident from the following description of examples taken in conjunction with the accompanying drawings.

BRIEF DESCRIPTION OF DRAWINGS

In the drawings, examples of the present principles are illustrated.

Similar or same elements are referenced with the same reference numbers.

DESCRIPTION OF EXAMPLE OF THE PRESENT PRINCIPLES

Figure 1:
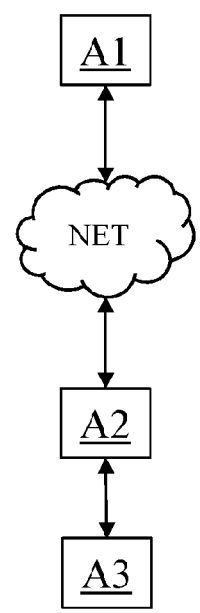
FIG. 1 shows a high-level representation of an end-to-end workflow supporting content delivery to displays with improved display adaptation feature in accordance with an example of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles. Although some of the diagrams include arrows on communication paths to show a primary direction of communication, it is to be understood that communication may occur in the opposite direction to the depicted arrows. Some examples are described with regard to block diagrams and operational flowcharts in which each block represents a circuit element, module, or portion of code which comprises one or more executable instructions for implementing the specified logical function (s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved. Reference herein to "in accordance with an example" or "in an example" means that a particular feature, structure, or characteristic described in connection with the example can be included in at least one implementation of the present principles. The appearances of the expression "in accordance with an example" or "in an example" in various places in the specification are not necessarily all referring to the same example, nor are separate or alternative examples necessarily mutually exclusive of other examples. Reference numerals appearing in the claims are by way of illustration only and shall have no limiting effect on the scope of the claims. While not explicitly described, the present examples and variants may be employed in any combination or sub-combination.

Typically, two different images have different dynamic range of the luminance. The dynamic range of the luminance of an image is the ratio between the maximum over the minimum of the luminance values of said image.

Typically, when the dynamic range of the luminance of an image is below 1000 (e.g. 500:100 $cd/m^2$ over 0.2 $cd/m^2$), said image is denoted as a Standard Dynamic Range (SDR) image and when the dynamic range of the luminance of an image is equal or greater than 1000 (e.g. 10000:1000 $cd/m^2$ over 0.1 $cd/m^2$), said image is denoted as an HDR image. Luminance is expressed by the unit candela per square meter ($cd/m^2$). This unit supersedes the term "nit" which may also be used (although it is deprecated in the International System of Units).

The present principles are described for pre-processing, encoding, decoding and post-processing an image but extends to pre-processing, encoding, decoding and post-processing of a sequence of images (video) because each image of the sequence is sequentially pre-processed, encoded, decoded and post-processed as described below.

FIG. 1 shows a high-level representation of an end-to-end workflow supporting content delivery to displays with improved display adaptation feature in accordance with an example of the present principles. The apparatus A1 is configured to implement a method for pre-processing and encoding an image or a video stream, the apparatus A2 is configured to implement a method for decoding and post-processing an image or video stream as described below, and the apparatus A3 is configured to display the decoded and post-processed image or video stream. The two remote apparatuses A1 and A2 are communicating over a distribution network NET that is configured at least to provide the encoded image or video stream from apparatus A1 to apparatus A2.

Apparatus A1 comprises at least one device configured to implement a pre-processing and/or encoding method as described herebelow. Said at least one device belongs to a set of devices comprising a mobile device, a communication device, a game device, a tablet (or tablet computer), a computer device such as a laptop, a still image camera, a video camera, an encoding chip, a still image server and a video server (e.g. a broadcast server, a video-on-demand server or a web server).

Apparatus A2 comprises at least one device configured to implement a decoding and/or post-processing method as described herebelow. Said at least one device belongs to a set of devices comprising a mobile device, a communication device, a game device, a computer device and a set top box.

Apparatus A3 comprises at least one device configured to implement a displaying method. Said at least one device belongs to a set of devices comprising a TV set (or television), a tablet (or tablet computer), a computer device such as a laptop, a display, a head-mounted display and a rendering/displaying chip.

In accordance with an example, the network is a broadcast network, adapted to broadcast still images or video images from apparatus A1 to a plurality of apparatuses A2. DVB and ATSC based networks are examples of such broadcast networks.

In accordance with another example, the network is a broadband network adapted to deliver still images or video images from apparatus A1 to a plurality of apparatuses A2.

Internet-based networks, GSM networks or TV over IP networks are examples of such broadband networks.

In an exemplary embodiment, the end-to-end workflow uses a broadcast server for apparatus A1, a set top box for apparatus A2, a television set for apparatus A3 and a DVB terrestrial broadcast network.

In an alternate embodiment, apparatus A2 and A3 are combined in a single device, for example a television integrating set top box decoding and post-processing functionalities.

In an alternate embodiment, the distribution network NET is replaced by a physical packaged media on which the encoded image or video stream is stored.

Physical packaged media comprise optical packaged media such a Blu-ray disc and Ultra HD Blu-ray but also memory-based package media such as used in OTT and VoD services.

Figure 2:
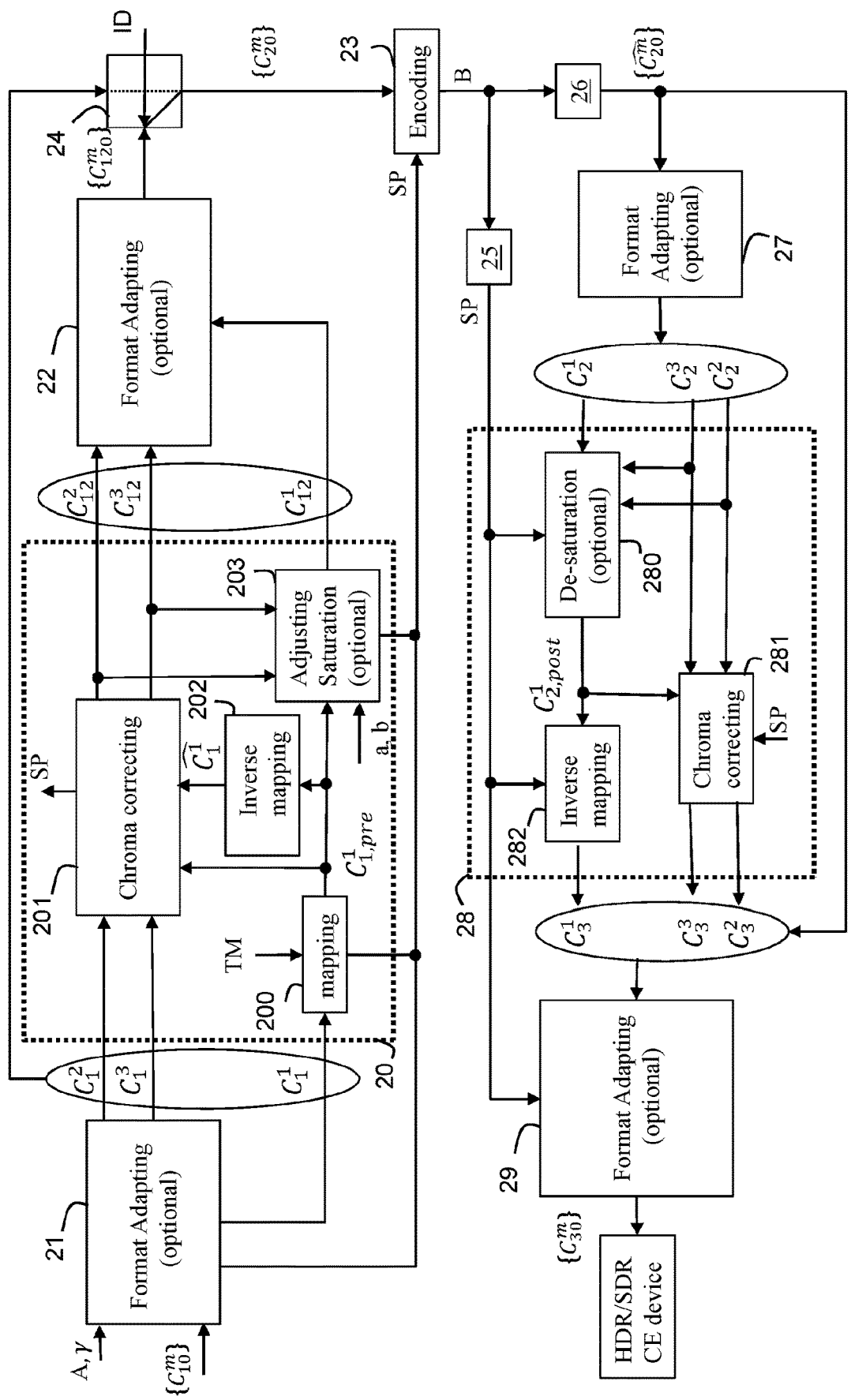
FIG. 2 shows an end-to-end workflow supporting content production and delivery to HDR and SDR CE displays in accordance with a single layer based distribution solution.

FIG. 2 shows an end-to-end workflow supporting content production and delivery to HDR and SDR CE displays in accordance with a single layer based distribution solution.

Basically, said single layer based distribution solution may address SDR direct backward compatibility i.e. it leverages SDR distribution networks and services already in place and enables high quality HDR rendering on HDR-enabled CE devices including high quality SDR rendering on SDR CE devices.

SL-HDR1 is one example of such single layer based distribution solution.

But, said single based layer distribution solution may also relate to a solution used on distribution networks for which display adaptation dynamic metadata are delivered along with an PQ HDR video signal. PQ means "Perceptual Quantization" as defined in Recommendation ITU-R BT.2100-1, "Image parameter values for high dynamic range television for use in production and international programme exchange".

The workflow shown in FIG. 2 involves a single layer-based distribution solution with associated metadata and illustrates an example of the use of a method for reconstructing three components $\{C_{30}^m\}$ representative of three components $\{C_{10}^m\}$ of an input image from three decoded components $\{\widehat{C_{20}^m}\}$ representative of a decoded image and said metadata as specified, for example, in SL-HDR1 or SL-HDR2.

An information data ID determines which single layer based distribution solution has to be considered. Usually, in practice only one single based layer distribution solution is instantiated and the information data ID is a fixed value. If more than one single layer based distribution solutions are instantiated, then the information data ID indicates which of these single layer based distribution solutions has to be considered.

Typically, SL-HDR1 and SL-HDR2 may be instantiated and the information data ID indicates if either SL-HDR1 or SL-HDR2 has to be considered.

Basically, the single layer based distribution solution shown in FIG. 2 comprises a pre-processing step 20, an encoding step 23, decoding steps 25 and 26 and a post-processing step 28.

In the following, a component $C_n^m$ designates a component m of an image n. These components $C_n^m$ represent an image $I_n$ in a specific image format. Typically, an image format is characterized by a color volume (e.g. chromaticity and dynamic range), a color encoding system (e.g. RGB, YCbCr).

The input and the output of the pre-processing step 20 are images represented by three components denoted $\{C_1^m\}$ and $\{C_{12}^m\}$ respectively, and the input and the output of the post-processing step 28 are images represented by three components denoted $\{C_2^m\}$ and $\{C_3^m\}$ respectively.

The single layer based distribution solution shown in FIG. 2 may comprise format adaptations steps 21, 22, 27, 29 to adapt the format of three components $\{C_n^m\}$ to the input of a further processing to be applied on these components.

For example, in step 21 (optional), the format of the three components $\{C_{10}^m\}$ are adapted to a format fitting an input format of the pre-processing step 20.

For example, the component $C_1^1$ is a non-linear signal, denoted luma in literature, which is obtained from the gamma-compressed components $\{C_{10}^m\}$ by:

$$C_1^1 = A_1 \begin{bmatrix} C_{10}^{1\ 1/\gamma} \\ C_{10}^{2\ 1/\gamma} \\ C_{10}^{3\ 1/\gamma} \end{bmatrix}$$

and the component q, $C_1^2$, $C_1^3$ are obtained by applying a gamma compression to the components of the input image:

$$\begin{bmatrix} C_1^2 \\ C_1^3 \end{bmatrix} = \begin{bmatrix} A_2 \\ A_3 \end{bmatrix} \begin{bmatrix} C_{10}^{1\ 1/\gamma} \\ C_{10}^{2\ 1/\gamma} \\ C_{10}^{3\ 1/\gamma} \end{bmatrix}$$

where $\gamma$ is a gamma factor, preferably equal to 2.4, $A=[A_1\ A_2\ A_3]^T$ is a conversion matrix comprising three 1×3 sub-matrices $A_1$, $A_2$, $A_3$ where $$A_1 = [A_{11} A_{12} A_{13}]$$

$$A_2 = [A_{21} A_{22} A_{23}]$$

$$A_3 = [A_{31} A_{32} A_{33}]$$

with $A_{mn}$ (m=1, . . . , 3, n=1, . . . 3) are sub-matrix coefficients.

For example, the conversion matrix A may be the canonical 3×3 R'G'B'-to-Y'CbCr conversion matrix as specified in Recommendation ITU-R BT.2020-2 or Recommendation ITU-R BT.709-6 when the three components $\{C_{10}^m\}$ are RGB components.

When BT.2020 color gamut is considered, $$A = \begin{bmatrix} A_1 \\ A_2 \\ A_3 \end{bmatrix} = \begin{bmatrix} 0.2627 & 0.678 & 0.0593 \\ -0.13963 & -0.36037 & 0.5 \\ 0.5 & -0.459786 & -0.040214 \end{bmatrix}$$

When BT.709 color gamut is considered, $$A = \begin{bmatrix} A_1 \\ A_2 \\ A_3 \end{bmatrix} = \begin{bmatrix} 0.2126 & 0.7152 & 0.0722 \\ -0.114572 & -0.385428 & 0.5 \\ 0.5 & -0.454153 & -0.045847 \end{bmatrix}$$

The convertion matrix A is invertible. For example, the inverse of the matrix A, denoted $A^{-1}$, is given by $$A^{-1} = \begin{bmatrix} 1 & 0 & A'_{13} \\ 1 & A'_{22} & A'_{23} \\ 1 & A'_{32} & 0 \end{bmatrix}$$

with $A'_{mn}$ (m=1, ..., 3, n=1, ... 3) are sub-matrix coefficients.

When BT.2020 color gamut is considered, $$A^{-1} = \begin{bmatrix} 1 & 0 & 1.4746 \\ 1 & -0.16455 & -0.57135 \\ 1 & 1.8814 & 0 \end{bmatrix}$$

and when BT.709 color gamut is considered, $$A^{-1} = \begin{bmatrix} 1 & 0 & 1.5748 \\ 1 & -0.18733 & -0.46813 \\ 1 & 1.85563 & 0 \end{bmatrix}$$

Said input format adaptation step 21 may also include adapting the bit depth of the input image $I_1$ to bit depth such as 10 bits for example, by applying a transfer function on at least one of the three components $\{C_{10}{}^m\}$ of an input image such as a PQ or HLG transfer function or its inverse (Rec. ITU-R BT.2100).

In step 22 (optional), the format of the three components $\{C_{12}{}^m\}$ may also be adapted to a format fitting the input format of the encoding step 23.

In step 27, (optional) the format of the three components $\{\widehat{C_{20}^m}\}$ may be adapted to a format fitting the input of the post-processing step 28, and in step 29, the format of the three components $\{C_3{}^m\}$ may be adapted to a format that may be defined from at least one characteristic of a targeted apparatus (e.g. a Set-Top-Box, a connected TV, HDR/SDR enabled CE device, an Ultra HD Blu-ray disc player). In step 21, the inverse of the matrix A is used.

Said format adaptation steps (21, 22, 27, 29) may include other color space conversion and/or color gamut mapping (and/or inverse color gamut mapping). Inverse gamut mapping may be used, for example, when the three decoded components $\{\widehat{C_{20}^m}\}$ and the three components $\{C_{30}{}^m\}$ of an output image or the three components $\{C_{10}{}^m\}$ of an input image are represented in different color spaces and/or gamut. Usual format adapting processes may be used such as R'G'B'-to-Y'CbCr or Y'CbCr-to-R'G'B' conversions, BT.709-to-BT.2020 or BT.2020-to-BT.709, down-sampling or up-sampling chroma components, etc.

For example, SL-HDR1 may use format adapting processes and inverse gamut mapping as specified in Annex D of the ETSI technical specification TS 103 433-1 V1.2.1 (August 2017).

In the pre-processing step 20, the three components $\{C_1{}^m\}$ are decomposed into three components $\{C_{12}{}^m\}$ (which format may have been possibly adapted during step 22 to get the three components $\{C_{120}{}^m\}$) and a set of parameters SP, and a switching step 24 determines if the three components $\{C_{20}{}^m\}$ are either the three components $\{C_1{}^m\}$ or the three components $\{C_{12}{}^m\}$ or $\{C_{120}{}^m\}$) which are encoded in the bitstream B (step 23).

In step 23, the three components $\{C_{20}{}^m\}$ may be encoded with any video codec and a signal comprising the bitstream B is carried throughout a distribution network.

According to variant step 23, the set of parameters SP and/or the information data ID are conveyed as associated static and/or dynamic metadata in the bitstream B.

According to a variant, the set of parameters SP and/or the information data ID are conveyed as associated static and/or dynamic metadata on a specific channel.

Then, at least one signal, intended to be decoded by the apparatus A2 of FIG. 1, carries the bitstream B and the accompanying metadata.

In a variant, the bitstream B is stored on a storage medium such as a Blu-ray disk or a hard disk or a memory of a Set-Top-Box for example.

In a variant, at least some accompanying associated metadata is stored on a storage medium such as an UltraHD Blu-ray disk or a hard disk or a memory of a Set-Top-Box for example.

Preferably, in step 23, a sequence of at least one triplet of components $\{C_{20}{}^m\}$, each representing an image, and possibly associated metadata are encoded with a video codec such as the H.265/HEVC codec or H.264/AVC.

In step 25, the set of parameters SP is obtained at least partially either from the bitstream B or from another specific channel. At least one of the parameters of the set of parameters SP may also be obtained from a separate storage medium.

In step 26, the three decoded components $\{\widehat{C_{20}^m}\}$ are obtained from the bitstream B.

In the post-processing step 28, which is a nearby functional inverse of the pre-processing step 20, the three components $\{C_{30}{}^m\}$ are reconstructed from the three decoded components $\{\widehat{C_{20}^m}\}$ and the obtained set of parameters SP.

In more detail, the pre-processing step 20 comprises steps 200-203.

In step 200, a component $C_{1,pre}{}^1$ is obtained by applying a mapping function on the component $C_1{}^1$ which represents the luminance of the input image.

Mathematically speaking, $$C_{1,pre}{}^1 = MF(C_1{}^1)$$

with MF being a mapping function that may reduce the dynamic range of the luminance of an image. Note that its inverse, denoted IMF, may inversely increase the dynamic range of the luminance of an image.

In step 202, a reconstructed component $\widehat{C_1^1}$ is obtained by applying an inverse-mapping function on the component $C_{1,pre}{}^1$:

$$\widehat{C_1^1} = IMF(C_{1,pre}{}^1)$$

where IMF is the functional inverse of the mapping function MF. The values of the reconstructed component $\widehat{C_1^1}$ belong thus to the dynamic range of the values of the component $C_1^1$.

In step 201, the components $C_{12}^2$ and $C_{12}^3$ are derived by correcting the components $C_1^2$ and $C_1^3$ representing the chroma of the input image as function of the component $C_{1,pre}^1$ and the reconstructed component $\widehat{C_1^1}$.

This step 201 allows to control the colors obtained from the three components $\{C_{12}^m\}$ and guarantees their perceptual matching to the colors of the input image. The correction of the components $C_1^2$ and $C_1^3$ (usually denoted chroma components) may be maintained under control by tuning the parameters of the chroma correcting and inverse mapping steps. The color saturation and hue obtained from the three components $\{C_{12}^m\}$ are thus under control. Such a control is not possible, usually, when a non-parametric mapping function (step 200) is used.

Optionally, in step 203, the component $C_{1,pre}^1$ may be adjusted to further control the perceived saturation, as follows:

$$C_{12}^1 = C_{1,pre}^1 - \max(0, a \cdot C_{12}^2 + b \cdot C_{12}^3)$$

where a and b are two parameters.

This step 203 allows to control the luminance (represented by the component $C_{12}^1$) to guarantee the perceived color matching between the colors (saturation and hue) obtained from the three components $\{C_{12}^m\}$ and the colors of the input image. The set of parameters SP may comprise information data relative to the mapping function or its inverse (steps 200, 202 and 282), information data relative to the chroma correcting (steps 201 and 281), information relative to the saturation adjusting function, in particular their parameters a and b (steps 203 and 280), and information relative to the conversion used in the format adapting stages 21, 22, 27, 29 (e.g. gamut mapping and/or inverse gamut mapping parameters).

For example, the control parameters relative to the function TM and/or ITM may be determined as specified in Clause C.2.2 (ETSI technical specification TS 103 433-1 V1.2.1) and the chroma correcting function pc) and their parameters may be determined as specified in Clause C.2.3 and C.3.4 (ETSI technical specification TS 103 433-1 V1.2.1), Examples of numerical values of the parameters of the set of parameters SP may be found, for example, in Annex F (Table F.1) (ETSI technical specification TS 103 433-1 V1.2.1).

Figure 3:
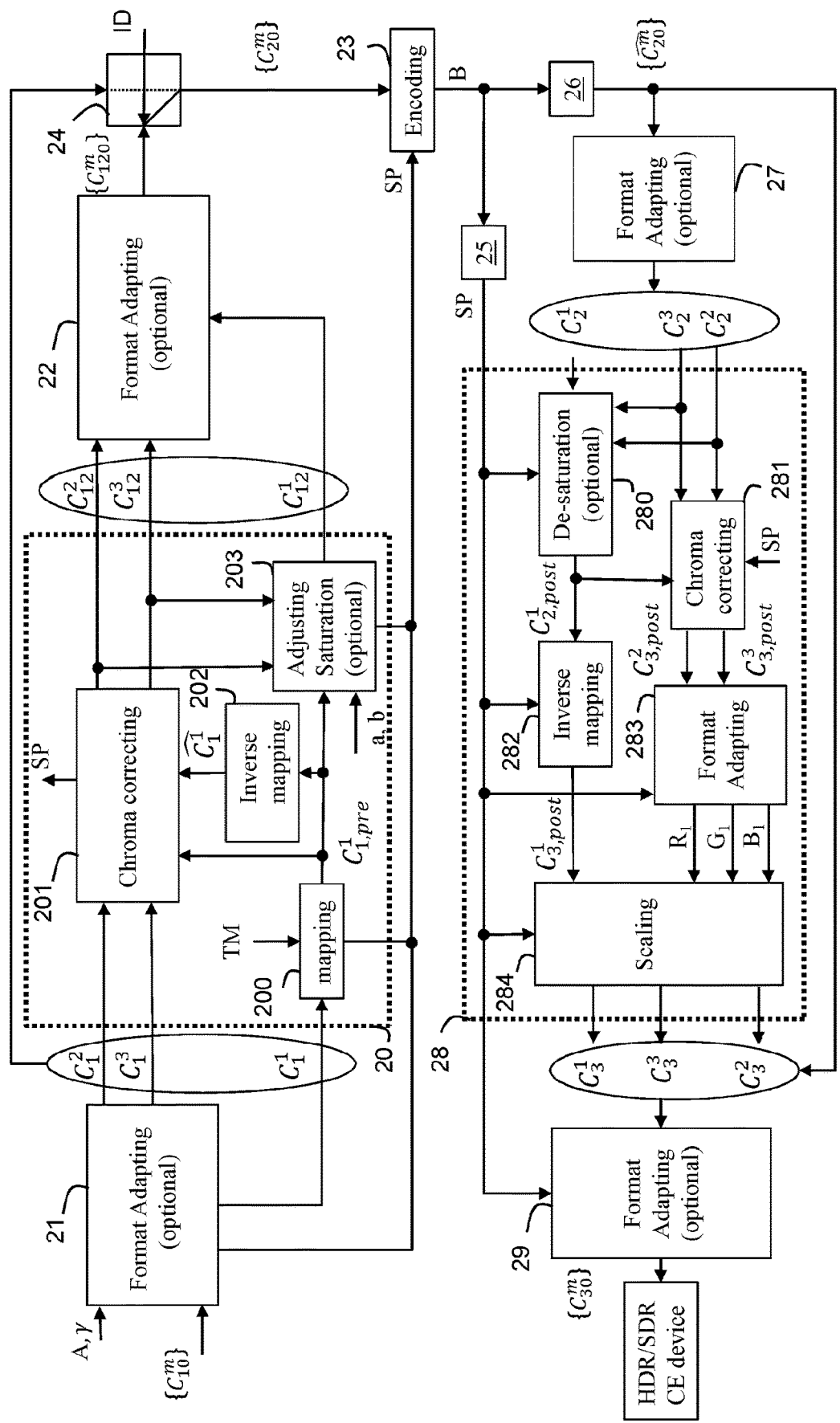
FIG. 3 shows a particular implementation of the workflow of FIG. 2.

The set of parameters SP may also comprise the information data ID and information characteristics of the three components $\{C_{30}^m\}$ (steps 29 of FIGS. 2 and 3, 284 of FIG. 3).

In more details, the post-processing step 28 comprises steps 280-282 which take as input at least one parameter of the set of parameters SP.

In optional step 280, the component CZ of the three components $\{C_2^m\}$, output of step 27, may be adjusted as follows:

$$C_{2,post}^1 = C_2^1 + \max(0, a \cdot C_2^2 + b \cdot C_2^3)$$

where a and b are two parameters of the set of parameters SP.

For example, the step 280 is executed when the information data ID indicates that SL-HDR1 has to be considered and not executed when it indicates that SL-HDR2 has to be considered.

In step 282, the component $C_3^1$ of the three components $\{C_3^m\}$ is obtained by applying a mapping function on the component CZ or, optionally, $C_{2,post}^1$:

$$C_3^1 = IFM(C_{2,post}^1)$$

where ITM is an inverse mapping function derived from at least one parameter of the set of parameters SP.

In step 281, the components $C_3^2$, $C_3^3$ of the three components $\{C_3^m\}$ are derived by inverse correcting the components $C_2^2$, $C_2^3$ of the three components $\{C_2^m\}$ according to the component $C_2^1$ or, optionally, $C_{2,post}^1$.

According to an embodiment, the components $C_2^2$ and $C_2^3$ are multiplied by a chroma correcting function $\beta(\cdot)$ as defined by parameters of the set of parameters SP and whose value depends on the component $C_2^1$ or, optionally, $C_{2,post}^1$.

Mathematically speaking, the components $C_3^2$, $C_3^3$ are given by:

$$\begin{bmatrix} C_3^2 \\ C_3^3 \end{bmatrix} = \beta(C_2^1) \begin{bmatrix} C_2^2 \\ C_2^3 \end{bmatrix}$$

or optionally, $$\begin{bmatrix} C_3^2 \\ C_3^3 \end{bmatrix} = \beta(C_{2,post}^1) \begin{bmatrix} C_2^2 \\ C_2^3 \end{bmatrix}$$

FIG. 3 represents a hardware-friendly optimization of single layer-based solution of FIG. 2. Said optimization includes two additional steps 283 and 284 and allows to reduce complexity for hardware implementation by reducing buses bitwidth use.

In step 283, three components denoted $(R_1, G_1, B_1)$ are obtained from components $C_{3,post}^2$ and $C_{3,post}^3$, outputs of the step 281, by taking into account parameters of the set of parameters SP:

$$\begin{bmatrix} R_1 \\ G_1 \\ B_1 \end{bmatrix} = \begin{bmatrix} 1 & 0 & m_0 \\ 1 & m_1 & m_2 \\ 1 & m_3 & 0 \end{bmatrix} \times \begin{bmatrix} S_0 \\ C_{3,post}^2 \\ C_{3,post}^3 \end{bmatrix}$$

where $m_0$, $m_1$, $m_2$, $m_3$ are parameters of the set of parameters SP and $S_0$ is derived from the components $C_{3,post}^2$ and $C_{3,post}^3$ and other parameters of the set of parameters SP.

Parameters $m_0$, $m_1$, $m_2$, $m_3$ and $S_0$ may be determined as defined in Clause 6.3.2.6 (ETSI technical specification TS 103 433-1 V1.2.1) and their use for reconstruction may be determined as defined in Clause 7.2.4 (ETSI technical specification TS 103 433-1 V1.2.1 and ETSI technical specification TS 103 433-2 V1.1.1).

In step 284, the three components $\{C_3^m\}$ are then obtained by scaling the three components $(R_1, G_1, B_1)$ according to a component $C_{3,post}^1$, output of step 282.

$$\begin{cases} C_3^1 = C_{3,post}^1 \times R_1 \\ C_3^2 = C_{3,post}^1 \times G_1 \\ C_3^3 = C_{3,post}^1 \times B_1 \end{cases}$$

where $C_{3,post}^1 = IMF(C_{2,post}^1)$ (step 282).

For example, the control parameters relative to the mapping function MF and/or its inverse IMF may be determined as specified in Clause C.3.2 (ETSI technical specification TS 103 433-1 V1.2.1). The chroma correcting function β(·) and their parameters may be determined as specified in Clause C.2.3 and C.3.4 (ETSI technical specification TS 103 433-1 V1.2.1). Information data relative to the control parameters relative to the mapping functions or their inverse and information data relative to the chroma correcting function β(·) and their parameters are elements of the set of parameters SP. Examples of numerical values of the parameters of the set of parameters SP may be found, for example, in Annex F (Table F.1) (ETSI technical specification TS 103 433-1 V1.2.1.

The parameters $m_0, m_1, m_2, m_3$ and $S_0$ may be determined as specified in Clause 6.3.2.6 (matrixCoefficient[i] are defining $m_0, m_1, m_2, m_3$) and Clause 6.3.2.8 (kCoefficient[i] are used to construct $S_0$) of ETSI technical specification TS 103 433-1 V1.2.1 and their use for reconstruction may be determined as specified in Clause 7.2.4 (ETSI technical specification TS 103 433-1 V1.2.1).

The mapping function MF(·) is based on a perceptual transfer function, whose goal is to convert a component of an input image into a component of an output image, thus reducing (or increasing) the dynamic range of the values of their luminance. The values of a component of the output image belong thus to a lower (or greater) dynamic range than the values of the component of an input image. Said perceptual transfer function uses a limited set of control parameters.

According to a first exemplary embodiment of the end-to-end workflow of FIG. 2 or FIG. 3, the information data ID indicates that SL-HDR1 has to be considered.

According to a first variant of said first exemplary embodiment, the component $C_1^1$ is a non-linear signal, denoted luma in literature, which is obtained (step 21) from the gamma-compressed RGB components of the input image by:

$$C_1^1 = A_1 \begin{bmatrix} R^{1/\gamma} \\ G^{1/\gamma} \\ B^{1/\gamma} \end{bmatrix}$$

Next, according to said first variant, the second and third component are then obtained (step 21), by applying a gamma compression to the RGB components of the input image:

$$\begin{bmatrix} C_1^2 \\ C_1^3 \end{bmatrix} = \begin{bmatrix} A_2 \\ A_3 \end{bmatrix} \begin{bmatrix} R^{1/\gamma} \\ G^{1/\gamma} \\ B^{1/\gamma} \end{bmatrix}$$

where γ may be a gamma factor, preferably equal to 2.4 and $A=[A_1 \ A_2 \ A_3]^T$ being the canonical 3×3 R'G'B'-to-Y'CbCr conversion matrix (e.g. Recommendation ITU-R BT.2020-2 or Recommendation ITU-R BT.709-6 depending on the color space), $A_1, A_2, A_3$ being 1×3 matrices.

Next, according to said first variant, the second and third components $C_1^2$ and $C_1^3$ are chroma corrected from the ratio between the first component $C_{1,pre}^1$ over the reconstructed component $\widehat{C_1^1}$:

$$\begin{bmatrix} C_{12}^2 \\ C_{12}^3 \end{bmatrix} = \frac{C_{1,pre}^1}{\Omega \widehat{C_1^1}} \cdot \begin{bmatrix} C_1^2 \\ C_1^3 \end{bmatrix}$$

where Ω is a constant value either depending on the color primaries of the three components $\{C_1^m\}$ (equals to 1.2 for Rec. BT.2020 for example) or being a parameter of the set of parameters SP Finally, according to said first variant, the three components $\{C_{12}^m\}$ may then be represented as a Y'CbCr 4:2:0 gamma transfer characteristics video signal.

According to a second variant of said first exemplary embodiment, the component $C_1^1$ of the input image is a linear-light luminance component L obtained from the RGB component of the input image $I_1$ by:

$$C_1^1 = L = A_1 \begin{bmatrix} R \\ G \\ B \end{bmatrix}$$

Next, according to said second variant, the second and third component are then derived by applying a gamma compression to the RGB components of the input image $$\begin{bmatrix} C_1^2 \\ C_1^3 \end{bmatrix} = \begin{bmatrix} A_2 \\ A_3 \end{bmatrix} \begin{bmatrix} R^{1/\gamma} \\ G^{1/\gamma} \\ B^{1/\gamma} \end{bmatrix}$$

Next, according to said second variant, the second and third component $C_{12}^2, C_{12}^3$ are then derived (step 201) by correcting the first and second components $C_1^2, C_1^3$ from the ratio between the first component $C_{1,pre}^1$ over the gamma-compressed reconstructed component $\widehat{C_1^1}$.

$$\begin{bmatrix} C_{12}^2 \\ C_{12}^3 \end{bmatrix} = \frac{C_{1,pre}^1}{\widehat{C_1^1}^{1/\gamma}} \begin{bmatrix} C_1^2 \\ C_1^3 \end{bmatrix}$$

According to a second exemplary embodiment of the end-to-end workflow of FIG. 2 or FIG. 3, the information data ID indicates that SL-HDR2 has to be considered.

The three components $\{C_1^m\}$ may then be represented as a Y'CbCr 4:4:4 full range PQ10 (PQ 10 bits) video signal (specified in Rec. ITU-R BT.2100). The three components $\{C_{20}^m\}$, which is an PQ 10-bits image data and associated metadata computed from the three components $\{C_1^m\}$ (typically 10, 12 or 16 bits), are provided, and said PQ 10-bits image data is then encoded (step 23) using, for example an HEVC Main 10 profile encoding scheme.

Next, according to said second variant, the second and third component $C_{12}^2, C_{12}^3$ are then derived (step 201) by correcting the first and second components $C_1^2, C_1^3$ from the ratio between the first component $C_{1,pre}^1$ over the reconstructed component $\widehat{C_1^1}$.

According to a first variant of said second exemplary embodiment, the three components $\{C_{30}^m\}$ are directly obtained from the three decoded components $\{\widehat{C_{20}^m}\}$.

According to a second variant of said second exemplary embodiment, in the post-processing step 28, three components $\{C_{30}{}^m\}$ are reconstructed from the three decoded components $\{\widehat{C_{20}^m}\}$ and the set of parameters SP (step 25).

The three components $\{C_{30}{}^m\}$ are then available for either an SDR or HDR enabled CE display. The format of the image $I_3$ is possibly adapted (step 29) as explained above. The mapping function TM of FIGS. 2 and 3 is based on a perceptual transfer function, whose goal is to convert a component of an input image $I_1$ into a component of an image $I_{12}$, thus reducing (or increasing) the dynamic range of the values of their luminance. The values of a component of an image $I_{12}$ belong thus to a lower (or greater) dynamic range than the values of the component of an input image $I_1$. Said perceptual transfer function uses a limited set of control parameters.

Figure 4A:
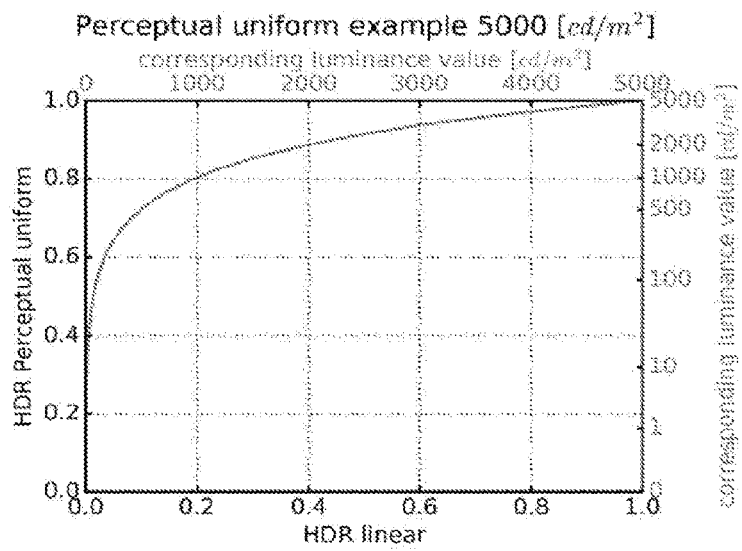
FIG. 4*a* shows an illustration of a perceptual transfer function.
Figure 4B:
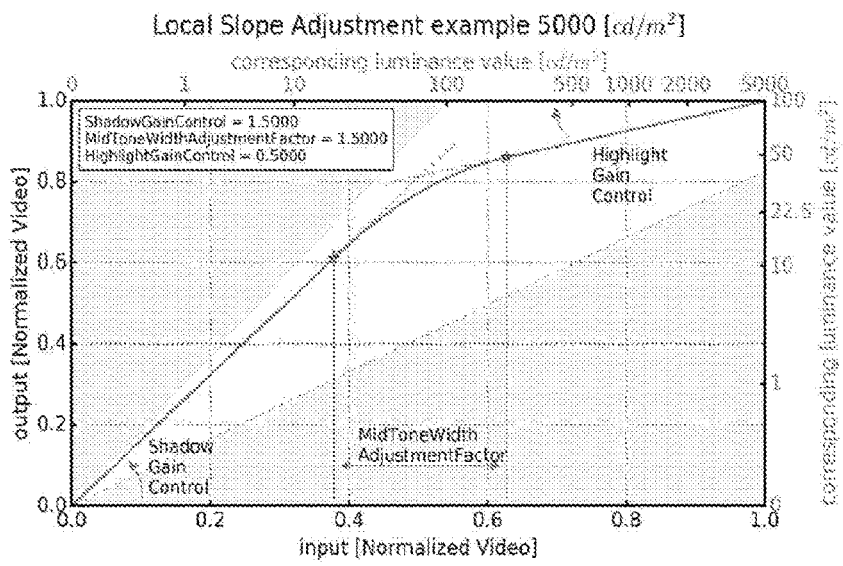
FIG. 4*b* shows an example of a piece-wise curve used for mapping.

FIG. 4a shows an illustration of a perceptual transfer function TM which may be used for mapping luminance components but a similar perceptual transfer function for mapping the luminance component may be used. The mapping is controlled by a mastering display peak luminance parameter (equal to 5000 cd/m² in FIG. 4a). To better control the black and white levels, a signal stretching between content-dependent black and white levels is applied. Then the converted signal is mapped using a piece-wise curve constructed out of three parts, as illustrated in FIG. 4b. The lower and upper sections are linear, the steepness being determined by the shadowGain control and highlightGain control parameters respectively. The mid-section is a parabola providing a continuous and smooth bridge between the two linear sections. The width of the cross-over is determined by the midToneWidthAdjFactor parameter. All the parameters controlling the mapping may be conveyed as metadata for example by using a SEI message as specified in ETSI TS 103 433-1 Annex A.2 metadata.

Figure 4C:
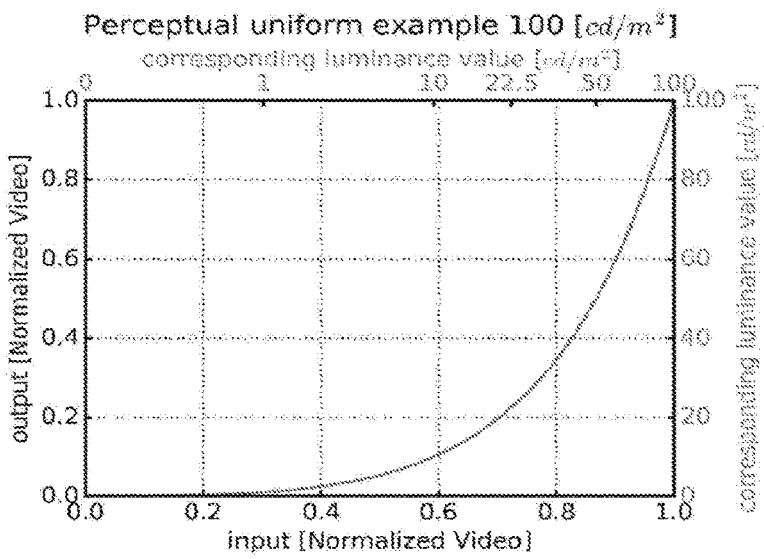
FIG. 4*c* shows an example of a curve used for converting back a perceptual uniform signal to a linear-light domain.

FIG. 4c shows an example of the inverse of the perceptual transfer function TM (FIG. 4a) to illustrate how a perceptually optimized luminance signal may be converted back to the linear-light domain based on a targeted legacy display maximum luminance, for example 100 cd/m².

In step 25 (FIG. 2 or 3), the set of parameters SP is obtained to reconstruct the three components $\{C_3{}^m\}$ from the three components $\{\widehat{C_{20}^m}\}$. These parameters may be obtained from metadata obtained from a bitstream, for example the bitstream B.

ETSI TS 103 433-1 V1.2.1 clause 6 and Annex A.2 provide an example of syntax of said metadata. The syntax of this ETSI recommendation is described for reconstructing an HDR video from an SDR video but this syntax may extend to the reconstruction of any image from any decoded components; as an example, TS 103 433-2 V1.1.1 uses the same syntax for reconstructing a display adapted HDR video from an HDR video signal (with a different dynamic range).

According to ETSI TS 103 433-1 V1.2.1, said dynamic metadata may be conveyed according to either a so-called parameter-based mode or a table-based mode. The parameter-based mode may be of interest for distribution workflows which primary goal is to provide direct SDR backward compatible services with very low additional payload or bandwidth usage for carrying the dynamic metadata. The table-based mode may be of interest for workflows equipped with low-end terminals or when a higher level of adaptation is required for representing properly both HDR and SDR streams. In the parameter-based mode, dynamic metadata to be conveyed are luminance mapping parameters representative of the inverse mapping function to be applied at the post-processing step, i.e. tmInputSignalBlackLevelOffset, tmInputSignalWhiteLevelOffset, shadowGain; highlightGain; midToneWidthAdjFactor; tmOutputFineTuning parameters.

Moreover, other dynamic metadata to be conveyed are color correction parameters (saturationGainNumVal, saturationGainX(i) and saturationGainY(i)) used to fine-tune the default chroma correcting function β(·) as specified in ETSI TS 103 433-1 V1.2.1 clauses 6.3.5 and 6.3.6. The parameters a and b may be respectively carried in the saturationGain function parameters as explained above. These dynamic metadata may be conveyed using the HEVC SL-HDR Information (SL-HDRI) user data registered SEI message (see ETSI TS 103 433-1 V1.2.1 Annex A.2) or another extension data mechanism such as specified in the AVS2/IEEE1857.4 specification. Typical dynamic metadata payload size is less than 100 bytes per picture or scene.

Back to FIG. 3, in step 25, the SL-HDRI SEI message is parsed to obtain at least one parameters of the set of parameters SP.

In step 282 and 202, the inverse mapping function ITM (so-called lutMapY) is reconstructed (derived) from the obtained mapping parameters (see ETSI TS 103 433-1 V1.2.1 clause 7.2.3.1 for more details, —same clause for TS 103 433-2 V1.1.1).

In step 282 and 202, the chroma correcting function β(·) (so-called lutCC) is also reconstructed (derived) from the obtained color correction parameters (see ETSI TS 103 433-1 V1.2.1 clause 7.2.3.2 for more details, same clause for TS 103 433-2 V1.1.1).

In the table-based mode, dynamic data to be conveyed are pivots points of a piece-wise linear curve representative of the mapping function. For example, the dynamic metadata are luminanceMappingNumVal that indicates the number of the pivot points, luminanceMappingX that indicates the abscissa (x) values of the pivot points, and luminanceMappingY that indicates the ordinate (y) values of the pivot points (see ETSI TS 103 433-1 V1.2.1 clauses 6.2.7 and 6.3.7 for more details). Moreover, other dynamic metadata to be conveyed may be pivots points of a piece-wise linear curve representative of the chroma correcting function pc). For example, the dynamic metadata are colorCorrectionNumVal that indicates the number of pivot points, colorCorrectionX that indicates the x values of pivot points, and colorCorrectionY that indicates the y values of the pivot points (see ETSI TS 103 433-1 V1.2.1 clauses 6.2.8 and 6.3.8 for more details). These dynamic metadata may be conveyed using the HEVC SL-HDRI SEI message (mapping between clause 6 parameters and annex A distribution metadata is provided in Annex A.2.3 of ETSI TS 103 433-1 V1.2.1).

In step 25, the SL-HDRI SEI message is parsed to obtain the pivot points of a piece-wise linear curve representative of the inverse mapping function and the pivot points of a piece-wise linear curve representative of the chroma correcting function pc), and the chroma to luma injection parameters a and b.

In step 282 and 202, the inverse mapping function is derived from those pivot points relative to a piece-wise linear curve representative of the inverse mapping function ITM (see ETSI TS 103 433-1 V1.2.1 clause 7.2.3.3 for more details,—same clause for ETSI TS 103 433-2 V1.1.1).

In step 281 and 201, the chroma correcting function pc), is also derived from those of said pivot points relative to a piece-wise linear curve representative of the chroma correcting function pc), (see ETSI TS 103 433-1 V1.2.1 clause 7.2.3.4 for more details, —same clause for TS 103 433-2 V1.1.1).

Note that static metadata also used by the post-processing step may be conveyed by SEI message. For example, the selection of either the parameter-based mode or table-based mode may be carried by the payloadMode information as specified by ETSI TS 103 433-1 V1.2.1 (clause A.2.2). Static metadata such as, for example, the color primaries or the maximum display mastering display luminance are conveyed by a Mastering Display Colour Volume (MDCV) SEI message as specified in AVC, HEVC or embedded within the SL-HDRI SEI message as specified in ETSI TS 103 433-1 V1.2.1 Annex A.2.

According to an embodiment of step 25, the information data ID is explicitly signaled by a syntax element in a bitstream and thus obtained by parsing the bitstream. For example, said syntax element is a part of an SEI message such as sl_hdr_mode_value_minus1 syntax element contained in SL-HDRI SEI message.

According to an embodiment, said information data ID identifies what is the processing applied to the input image $I_1$ to process the set of parameters SP. According to this embodiment, the information data ID may then be used to deduce how to use the parameters to reconstruct the three components $\{C_3^m\}$ (step 25).

For example, when equal to 1, the information data ID indicates that the set of parameters SP has been obtained by applying the SL-HDR1 pre-processing step (step 20) to an input image and that the three decoded components $\{\widehat{C_{20}^m}\}$ form an SDR image. When equal to 2, the information data ID indicates that the parameters have been obtained by applying the SL-HDR2 pre-processing step (step 20) to an HDR 10 bits image (input of step 20), that the three decoded components $\{\widehat{C_{20}^m}\}$ are an HDR10 image, and the inverse mapping function ITM function may be composed by a PQ transfer function (or its inverse).

Medium Dynamic Range (MDR) distribution corresponds to a use case extracted during DVB Dynamic Mapping Information (a.k.a. DMI) (i.e. HDR dynamic metadata) standardization phase. Typically, an MDR display (such as qualified in this document) is an HDR display characterized by a peak luminance of several hundreds of cd/m² (e.g. 500 cd/m²) while an HDR display (such as referenced in this document) ranges with a peak luminance from a thousand to several thousands of cd/m² (e.g. 1000 or 2000 cd/m²). Especially HDR peak luminance is greater than MDR peak luminance.

Indeed, it is of uttermost interest for the operator to ensure the highest possible quality in terms of image rendition for its clients. Thus, MDR distribution appears as a first step to broadcast a signal which fits consumer displays in "average".

Figure 6:
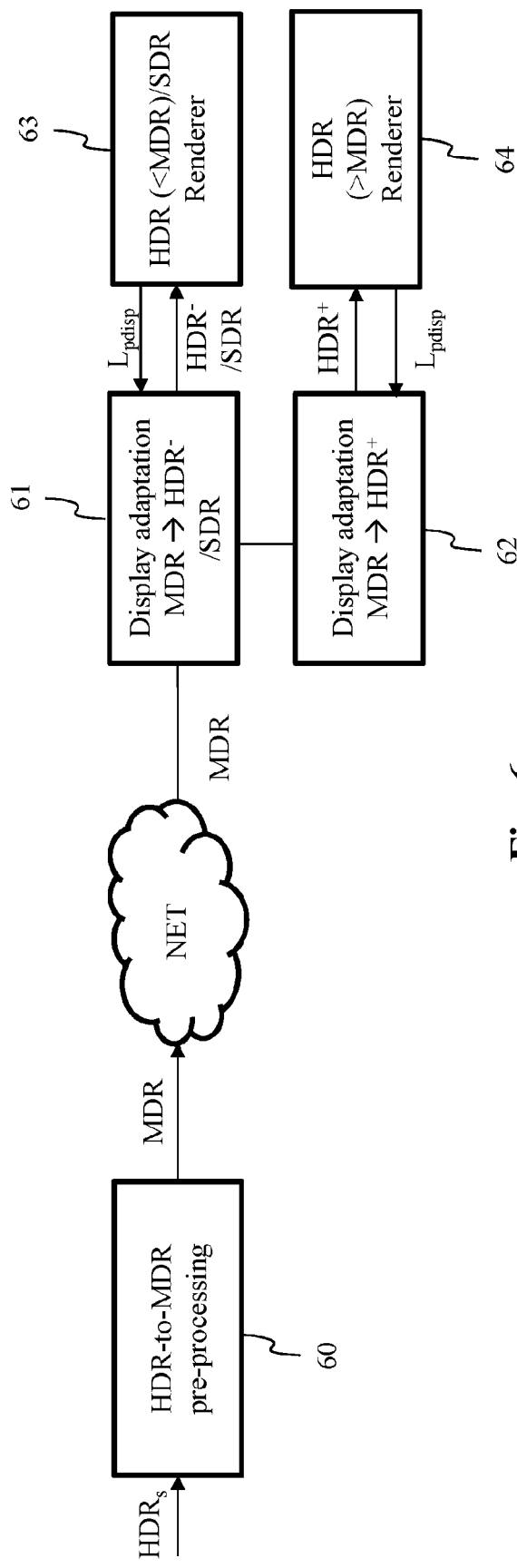
FIG. 6 shows schematically an MDR distribution use case.

FIG. 6 represents an MDR distribution use case. In the figure, a source signal $HDR_s$ is converted by a pre-processing block 60 to a Medium Dynamic Range signal MDR, which is distributed over a network NET such as mentioned above. At the receiving end, the Medium Dynamic Range signal MDR is, depending on the peak luminance of the presentation display $L_{pdisp}$ of the connected display, either down-mapped in block 61 to an HDR⁻ or SDR signal or up-mapped in block 62 to an HDR⁺ signal. The "HDR (>MDR) rendering" 64 of the HDR⁺ signal is performed by a high-end TV with superior processing and peak luminance, while "HDR (<MDR)/SDR rendering" 63 of the HDR⁻ signal is performed by entry-level to mid-range displays. HDR/MDR signals are typically distributed with PQ10 signal coding (see. Rec. ITU-R BT.2100 [3]). For simplification's sake, coding/decoding stages does not appear on the scheme. Furthermore, the display adaptation, a.k.a. display mapping, processing 61, 62 may be embedded in a display with the rendering or they can be set outside the display in a source device (e.g. STB).

The idea behind this use case is that the content distributors broadcast an HDR signal with an intermediary dynamic range MDR signal which is more representative of the majority of deployed HDR displays characteristics than the original HDRs signal mastered on a high-end mastering display with superior dynamic range. As the operator controls the HDR-to-MDR down-conversion 60 upstream of the distribution stage, the quality of the rendering on consumer displays is better preserved as display image processing leeway is minimized. Indeed, display image processing is often performed through statistics of the content to be rendered but without any guidance from the content producer—the display adaptation can be qualified as "blind" unlike display adaptation processing driven by (dynamic) metadata carried at least from the emission encoder and which results are controlled by the operator.

Some advantages of MDR distribution are as follows:
  the distributed MDR signal better fits to actual deployed HDR displays characteristics (less range for signal conversions in the display);
  HDR-to-MDR signal is controlled by the operator thus guaranteeing content artistic intent preservation (critical especially for vertical market/pay TV operators);
  the operator may adapt the distributed signal over years to better match its clients average display characteristics (e.g. increasing distributed MDR peak luminance when the clients display fleet peak luminance increases).

Display mapping algorithms are in charge of performing the adaptation of the (MDR) signal dynamic range to the displays capabilities. However, the large variety of displays over a wide product range from low-end devices with cheap processing to high-end system-on-chips embedding highly complex image processing modules and various display technologies such as LED, OLED or QDOT conduct to important inequality in terms of content rendition. Differences have even recently increased with the advent of HDR which offer higher differentiation opportunities. The problem is that built-in display mapping is largely dependent on the display price range (SoC complexity) and rendering technology. Besides, such "blind" display mapping algorithms (i.e. not guided nor elected by operator) may not succeed in sticking to the original content artistic intent especially when the display characteristics are very different from those of the mastering display used to grade the content. In this case, there are benefits to take advantage of dynamic mapping metadata which convey an operator-approved dynamic mapping of the content.

There are two formats for carrying HDR signals: HLG and PQ (see. [3]). Pay TV operators may rather consider PQ when it comes to quality ensuring as the signal is carried throughout the end-to-end video chain without compromises on the quality. HLG format proposes built-in display adaptation but with limitations that may not satisfy pay TV operators requirements in terms of quality (see [3] and [4]). However, the following principles may also apply to display adaptation over HLG-formatted HDR signals.

Considering SL-HDR technologies (ETSI TS 103 433 suite of standards), SL-HDR2 proposes display mapping guided by dynamic metadata for HDR PQ10-coded signals.

Figure 7:
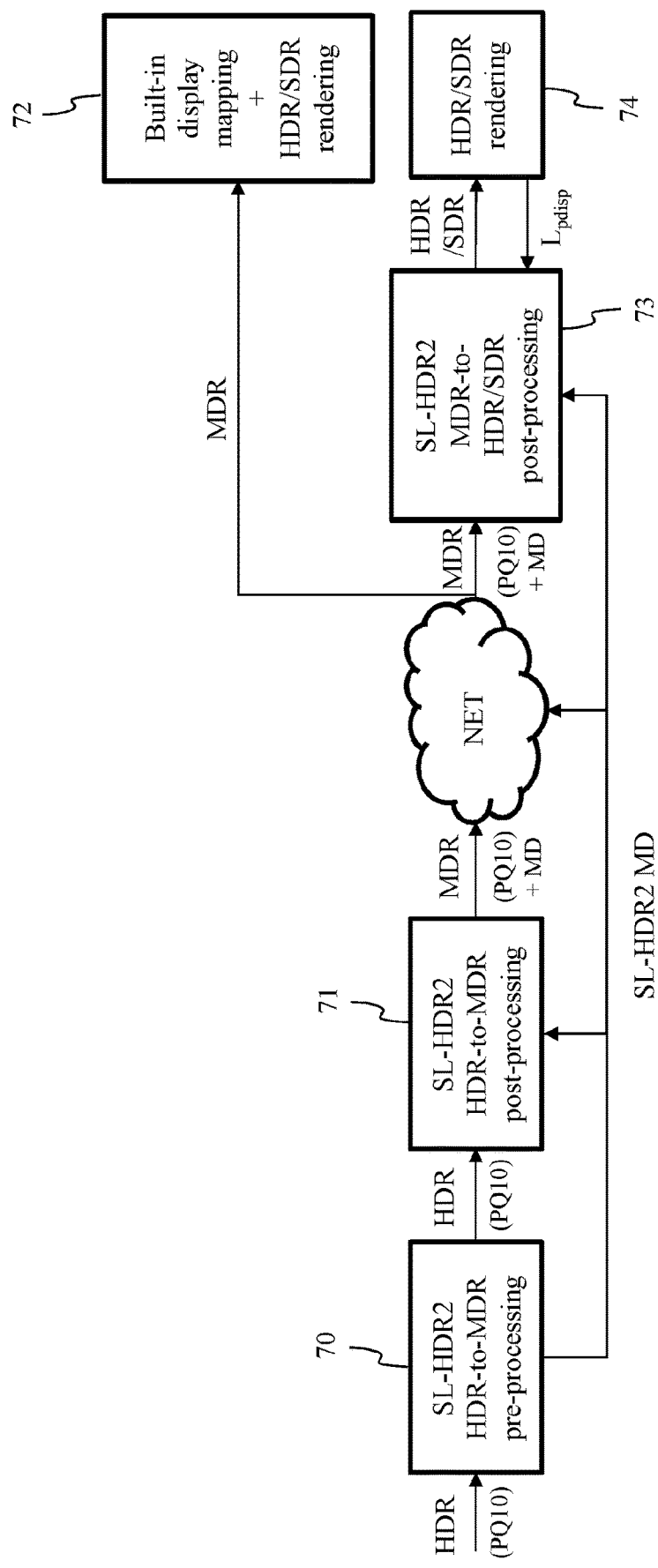
FIG. 7 shows schematically a S-LHDR-2 built-in display mapping.

This is illustrated in FIG. 7, where at the distribution stage an incoming HDR PQ10-coded signal is analysed by a pre-processing block 70 to generate the dynamic metadata SL-HDR2 MD. The HDR signal is converted into a Medium Dynamic Range signal MDR by post-processing block 71 and distributed over distribution network NET with accompanying metadata MD. Also the additional dynamic metadata SL-HDR2 MD are transmitted on the distribution network, typically by way of the SEI messaging mechanism.

Downstream to the distribution network the MDR signal may be directly interpreted by a PQ10 compliant display and the display mapping 72 may occur in the display (or upstream to the display e.g. in a source receiver such as a STB, an UltraHD Blu-ray disk player . . . ). Alternatively, the MDR signal accompanied by MDR-to-HDR/SDR metadata (e.g. SL-HDR2 metadata) may be interpreted by a device comprising an "MDR-to-HDR/SDR post-processing" block 73 (e.g. an STB or a TV integrating an SL-HDR2 post-processor) to reconstruct a display adapted HDR or SDR signal. This block 73 may be directly embedded in the presentation display or set apart in a source device (e.g. STB) which dispatches the display adapted/reconstructed signal to the presentation display for HDR/SDR rendering 74.

Annex H "Minimum and maximum value of Lpdisp for display adaptation" of the SL-HDR2 specification ([2]) provides recommendations on presentation display peak luminance range for which SL-HDR2 display mapping may be used. As mentioned there, in case Lpdisp is anywhere in between 100 cd/m² and the maximum luminance of the HDR grading monitor, hdrDisplayMaxLuminance (clause 6.2.3 in [1]), the metadata recomputation for display adaptation of clause 7.3 is in effect an interpolation. It is possible to recompute the metadata using the same procedure of clause 7.3 to perform display adaptation for a presentation display with a value of Lpdisp that is higher than the maximum luminance of the HDR grading monitor. Because this is now an extrapolation, care should be taken not to use values for Lpdisp that are too high. This clause offers a recommendation for the lower and upper boundary of Lpdisp for applying the procedure of clause 7.3 for display adaptation. Display adaptation should not be used for a value of Lpdisp lower than Lpdisp_min or higher than Lpdisp_max, see the following equations $$L_{pdisp\_min} = 100 \text{ cd/m2}$$

$$L_{pdisp\_max} = \begin{cases} L_{HDR} \times 2, & \text{if } L_{HDR} \le 1000 \text{ cd/m}^2 \\ \text{Min}(\text{Max}(L_{HDR} \times 1, 25; 2\,000); 10000), & \text{otherwise} \end{cases}$$

where:
$L_{HDR}$ is the HDR mastering display maximum luminance hdrDisplayMaxLuminance.

Figure 8:
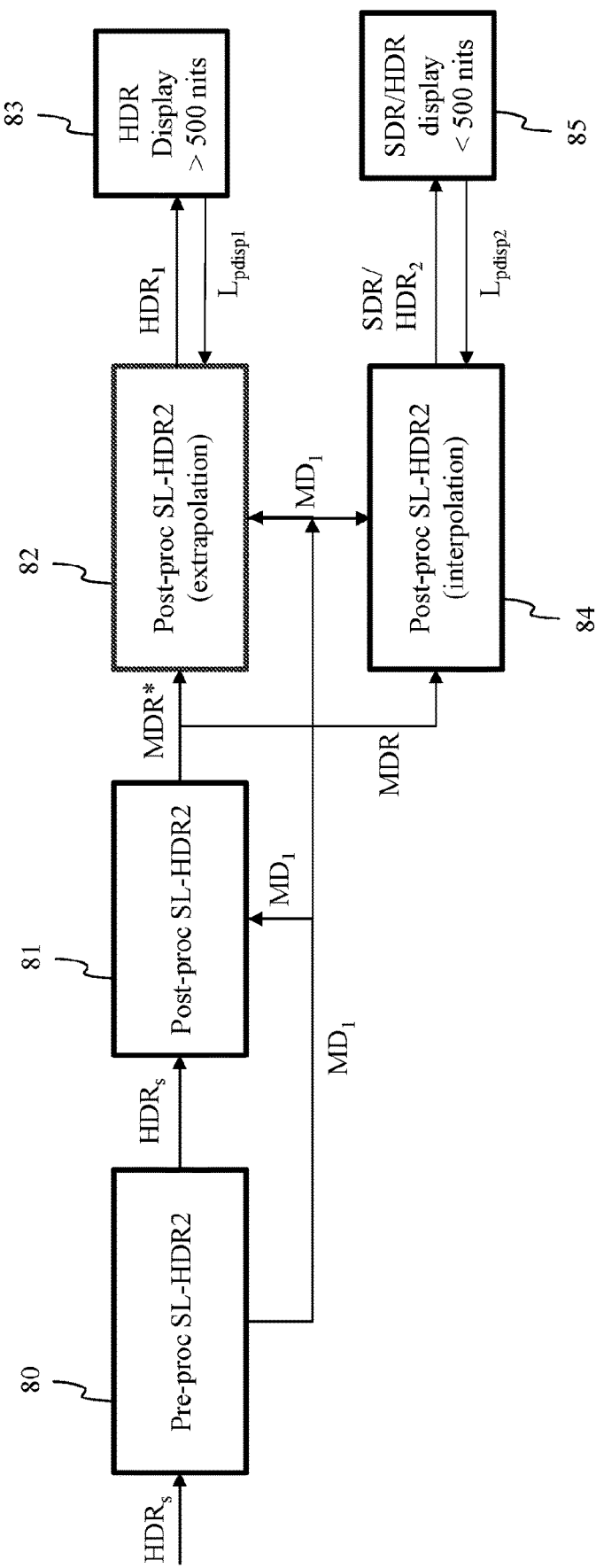
FIG. 8 shows schematically a S-LHDR-2 solution for addressing MDR.

A S-LHDR-2 solution for addressing MDR signals is schematically shown in FIG. 8, wherein the peak luminance for the $HDR_s$, MDR, HDR, and $HDR_2$ signals could be for example as follows:

$LHDR_s > 500$ cd/m²

$LMDR = 500$ cd/m²

$LHDR_1 > 500$ cd/m²

$LHDR_2 < 500$ cd/m²

Similar to FIG. 7, an incoming PQ10-coded signal $HDR_s$ is analysed by a pre-processing block 80 to generate dynamic metadata $MD_1$. The HDR signal is converted into a Medium Dynamic Range signal MDR by post-processing block 81.

Downstream to the distribution network the MDR signal is adapted to the peak luminance of the presentation display. In case of a HDR display 83 with a maximum luminance value LHDR, the peak luminance value of the presentation display $L_{pdisp1}$ is supplied to the "Post-proc SL-HDR2" block 82 which performs an up-mapping of the distributed MDR signal by extrapolation. On the other hand, for rendering the received signal on a SDR/HDR display 85 with a maximum luminance value $LHDR_2$, a down-mapping of the distributed MDR signal via interpolation is performed by the "Post-proc SL-HDR2" block 84 in response to the peak luminance value of the presentation display $L_{pdisp2}$.

This SL-HDR2 solution is well designed for addressing presentation displays which peak luminance is lower than the peak luminance of the transmitted MDR signal. However, although current SL-HDR2 technology permits to extrapolate the MDR peak luminance signal to a higher HDR peak luminance (e.g. considering a premium TV sets with a peak luminance beyond 1000 cd/m²), the extrapolated signal does not take into account the original source HDR signal (upstream to the HDR-to-MDR pre-processing module at the emission encoder side) thus such a display adapted signal may deviate from the original signal intent. The present embodiments propose a solution to circumvent this limitation of the SL-HDR2 design for MDR signals, wherein the following principles may apply to HLG-based technology.

The ETSI TS 103 433 (SL-HDR) suite of standards—comprising part 1 specifying SL-HDR1 and part 2 specifying SL-HDR2—implements pre-processing and post-processing modules. The pre-processing module generates metadata (operator-approved) and the post-processing module applies metadata to a signal in order to reconstruct another signal. The post-processing module is implemented in consumer equipment as a unique hardware block so that this same hardware block is used to interpret SL-HDR1 and SL-HDR2 signals: the SL-HDR post-processor. The SL-HDR metadata are also common to part 1 and 2.

The global idea of the present embodiments is to leverage either SL-HDR2 post-processor for down-mapping the MDR signal or SL-HDR1 post-processor for up-mapping the MDR signal by reusing this existing common hardware module (present in consumer electronics devices implementing SL-HDR post-processor) and reconfiguring to either SL-HDR1 or SL-HDR2 mode to reply to the current limitations.

Figure 9:
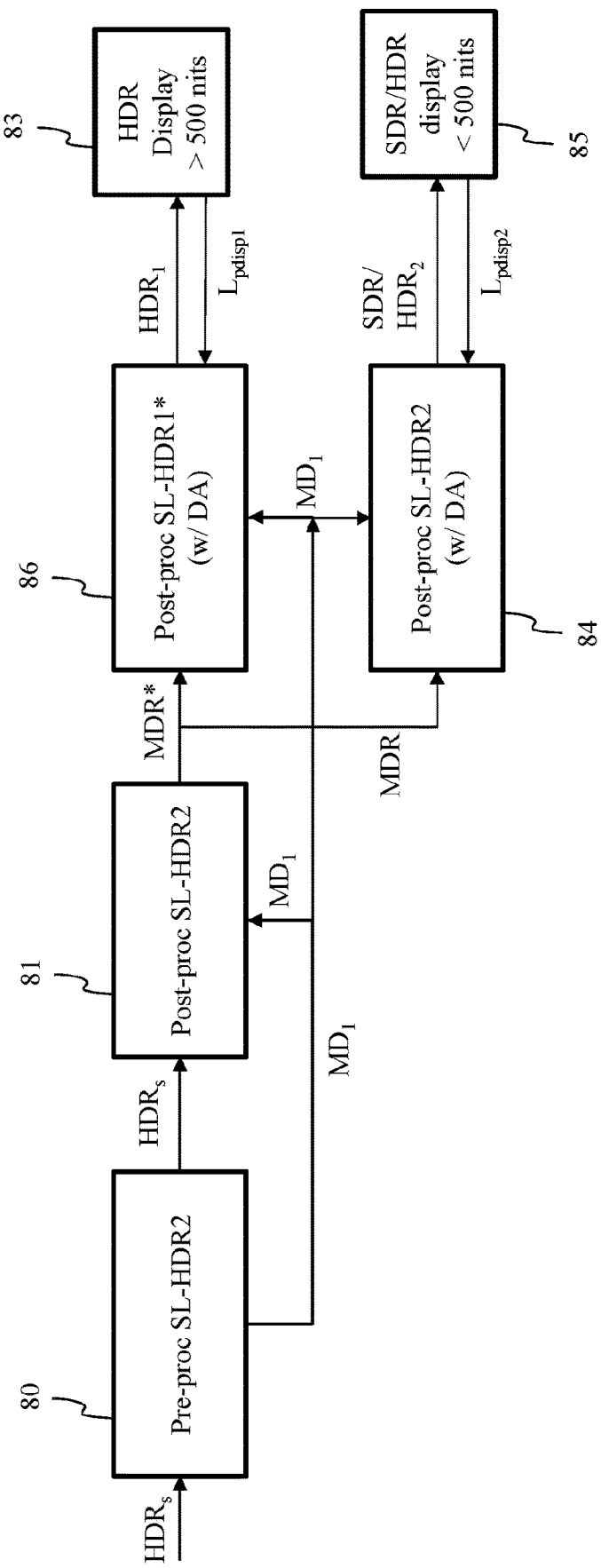
FIG. 9 shows schematically an example of the present embodiments for addressing MDR.

The corresponding SL-HDR post-processor logic modification is shown in FIG. 9. Typically, pre-distribution stages 80 and 81 are identical to the ones previously described in the context of FIG. 8. In particular, the SL-HDR2 metadata are generated once by the SL-HDR2 pre-processor and then, a SL-HDR2 post-processor is applying computed metadata to perform the HDR-to-MDR conversion (i.e. actually operating an SL-HDR2 display mapping process prior to the distribution stage). Afterwards, the MDR signal and SL-HDR metadata are transmitted on the distribution network.

Figure 10:
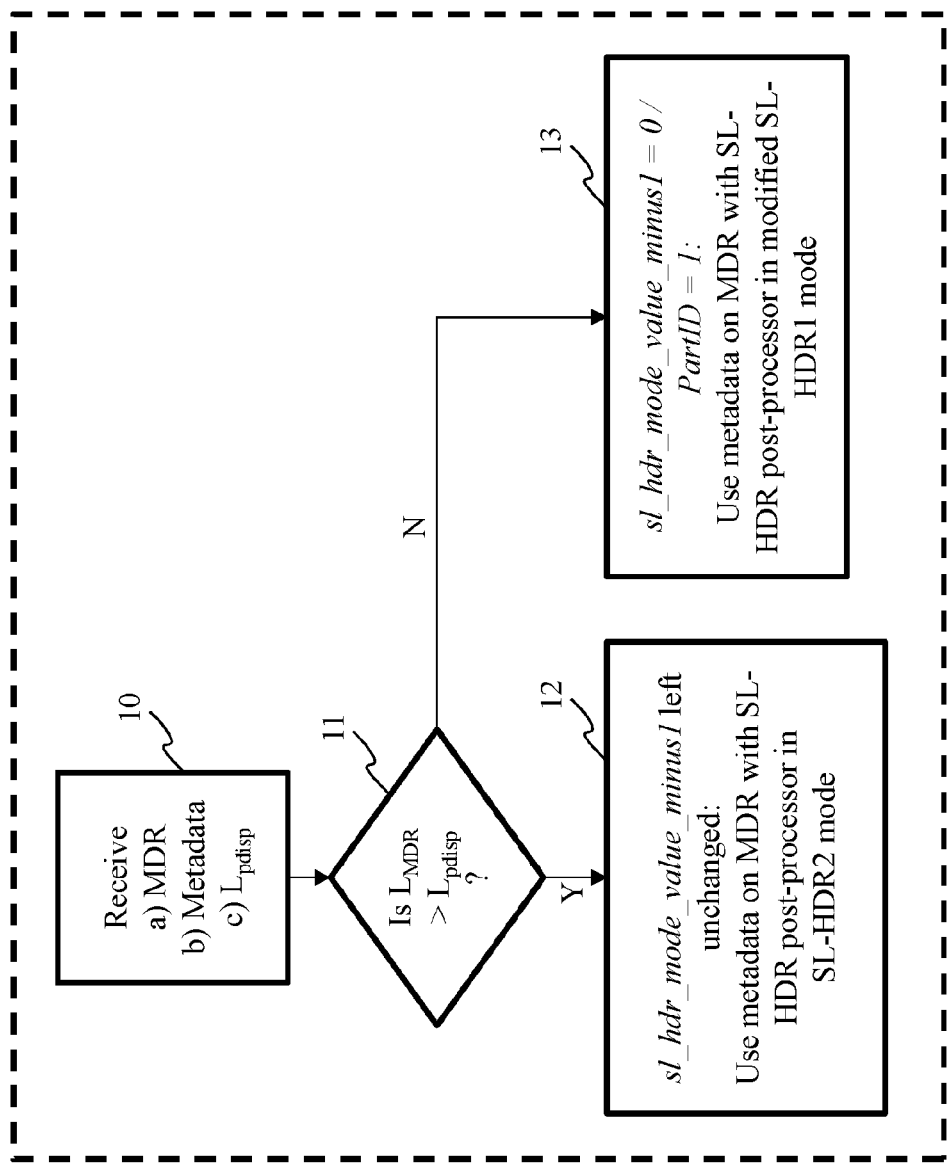
FIG. 10 shows a diagram of the adapted SL-HDR post-processor logic.

After the distribution network, the SL-HDR post-processor, which can be integrated in a consumer electronic device, is changed as shown in FIG. 10:

1) In a first step 10 the SL-HDR post-processor receives:
   a) the MDR signal
   b) the MDR-to-HDR/SDR (SL-HDR) metadata
   c) (at least) the peak luminance of the presentation display ($L_{pdisp}$)

(e.g. through EDID—See CTA-861.3/CTA-861-G [5])

2) The SL-HDR post-processor determines in a following step 11 whether the peak luminance of the MDR signal ($L_{MDR}$) is greater or lower than the peak luminance of the presentation display ($L_{pdisp}$) which the MDR signal should be adapted to.

3) Metadata application in SL-HDR post-processor:
   a) If ($L_{MDR} > L_{pdisp}$) then SL-HDR2 post-processor is used in step 12 for application on SL-HDR2 metadata
   b) Otherwise (if $L_{MDR} \leq L_{pdisp}$) then a modified SL-HDR1 post-processor is used in step 13 for application on SL-HDR2 metadata rather than using extrapolation of SL-HDR2 metadata.

It is to be noted that alike SL-HDR post-processor hardware, SL-HDR metadata are common to SL-HDR1 and 2.

According to an embodiment, the common SL-HDR post-processor (i.e. common to SL-HDR1 or 2) usually enters a specific mode (SL-HDR1 or 2) responsive to the field sl_hdr_mode_value_minus1 (matching with the PartID variable) of the SL-HDR dynamic metadata specified in Annex A of [1]. The value of this field is overwritten according to the logic depicted in FIG. 10 (case 3) b) above). Additionally, when the field is overwritten in the SL-HDR post-processor, the SL-HDR1 post-processor is modified (adapted) as explained below.

Adaptations to be operated on the input of SL-HDR1 post-processor are twofold:
   The SL-HDR1 post-processor conventional input is a signal encoded with gamma transfer function and not PQ (or HLG) and
   The SL-HDR1 post-processor conventional input is an SDR signal (whose peak luminance is assumed to be 100 cd/m$^2$) and not the peak luminance of an HDR/MDR signal (typically over 100 cd/m$^2$).

Thus, in the processing of the MDR signal by the modified SL-HDR1 post-processor, the processing specified in clause 7.2.3.1.3 (block "To perceptual uniform signal") of TS 103 433-1 [1] is replaced by processing specified in clause 7.2.3.1.3 (block "To perceptual uniform signal") of TS 103 433-2 [2] so that SL-HDR1 could linearize an HDR PQ signal (in which the MDR signal is represented) rather than an SDR (gamma-encoded) signal. The processing specified in clause 7.2.3.1.3 is part of step 282 in FIGS. 2 and 3.

Similarly, processing block specified in clause 7.2.3.1.9 (block "Inverse EOTF") of [1] is replaced by processing block specified in 7.2.3.1.9 of [2]. The processing specified in clause 7.2.3.1.9 is part of step 282 in FIGS. 2 and 3.

Besides, $L_{SDR}$ representing the maximum display mastering luminance of an SDR mastering display of 100 cd/m$^2$ should be set to the maximum luminance (or peak luminance) of the MDR signal in any relevant portion of [1] i.e. whenever $L_{SDR}$ appears in the specification it should be replaced by $L_{MDR}$ in the whole document.

For instance, this information is retrieved thanks to the field coded_picture_max_luminance set when coded_picture_info_present_flag is set to 1.

Alternatively, information can be obtained from target picture_max_luminance field. These fields are specified in Annex A of [1].

In a variant, chroma_to_luma_injection[i] and k_coefficient[j] parameters values which are fixed to 0 for SL-HDR2 are changed when SL-HDR1 post-processor is used i.e. when SL-HDR post-processor is configured in an SL-HDR1 post-processor mode to up-map the MDR signal.

As an example, these values are defaulted to recovery mode values such as described in Table F.1 in annex F of TS 103 433-1.

Some advantages of the embodiments are as follows:
Using SL-HDR1 post-processing for up-mapping of a MDR signal improves rendition of the reconstructed HDR signal over SL-HDR2 post-processing as SL-HDR1 natively up-maps signals while SL-HDR2 natively down-maps signals by design (no extrapolation of the MDR signal but considering the original signal peak luminance prior to its MDR down-conversion), thus resulting in optimal usage of the SL-HDR post-processor.

The solution could be deployed as a firmware update for SL-HDR-enabled consumer products already on the market.

On FIG. 1-4c, 6-10, the modules are functional units, which may or not be in relation with distinguishable physical units. For example, these modules or some of them may be brought together in a unique component or circuit or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a apparatus or from a blend of hardware and software components.

Figure 5:
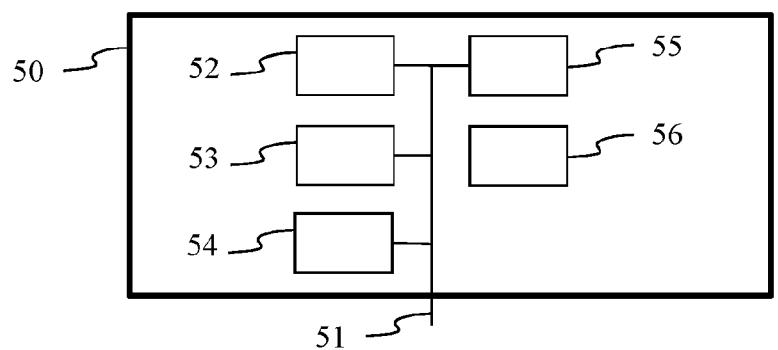
FIG. 5 shows an exemplary embodiment of an architecture of a apparatus which may be configured to implement a method described in relation with FIG. 1 to FIG. 4*c;*

FIG. 5 represents an exemplary embodiment of an architecture of a apparatus 50 which may be configured to implement a method described in relation with FIG. 1 to FIG. 4c, 6-10.

Apparatus 50 comprises following elements that are linked together by a data and address bus 51: a microprocessor 52 (or CPU), which is, for example, a DSP (or Digital Signal Processor), a ROM (or Read Only Memory) 53, a RAM (or Random Access Memory) 54, an I/O interface 55 for reception of data to transmit, from an application and optionally a battery 56. In accordance with an example, the battery 56 is external to the apparatus. In each of mentioned memory, the word «register» used in the specification can correspond to area of small capacity (some bits) or to very large area (e.g. a whole program or large amount of received or decoded data). The ROM 53 comprises at least a program and parameters. The ROM 53 may store algorithms and instructions to perform techniques in accordance with present principles. When switched on, the CPU 52 uploads the program in the RAM 54 and executes the corresponding instructions. RAM 54 comprises, in a register, the program executed by the CPU 52 and uploaded after switch on of the apparatus 50, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a apparatus), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing apparatuses in general, including, for example, a computer, a microprocessor, an integrated circuit, or a programmable logic apparatus. Processors also include communication apparatuses, such as, for example, computers, cell phones, portable/personal digital assistants ("PDAs"), and other apparatuses that facilitate communication of information between end-users.

In accordance with an example, the input video or an image of an input video is obtained from a source. For example, the source belongs to a set comprising a local memory (53 or 54), e.g. a video memory or a RAM (or Random Access Memory), a flash memory, a ROM (or Read Only Memory), a hard disk, a storage interface (55), e.g. an interface with a mass storage, a RAM, a flash memory, a ROM, an optical disc or a magnetic support, a communication interface (55), e.g. a wireline interface (for example a bus interface, a wide area network interface, a local area network interface) or a wireless interface (such as a IEEE 802.11 interface or a Bluetooth® interface); and an image capturing circuit (e.g. a sensor such as, for example, a CCD (or Charge-Coupled Device) or CMOS (or Complementary Metal-Oxide-Semiconductor)).

In accordance with examples, the bitstream carrying on the metadata is sent to a destination. As an example, a bitstream is stored in a local or remote memory, e.g. a video memory or a RAM (54), a hard disk. In a variant, at least one of the bitstreams is sent to a storage interface (55), e.g. an interface with a mass storage, a flash memory, ROM, an optical disc or a magnetic support and/or transmitted over a communication interface (55), e.g. an interface to a point to point link, a communication bus, a point to multipoint link or a broadcast network.

In accordance with other examples, the bitstream carrying on the metadata is obtained from a source. Exemplarily, the bitstream is read from a local memory, e.g. a video memory (54), a RAM (54), a ROM (53), a flash memory (53) or a hard disk (53). In a variant, the bitstream is received from a storage interface (55), e.g. an interface with a mass storage, a RAM, a ROM, a flash memory, an optical disc or a magnetic support and/or received from a communication interface (55), e.g. an interface to a point to point link, a bus, a point to multipoint link or a broadcast network.

In accordance with examples, apparatus 50 being configured to implement the method as described above, belongs to a set comprising a mobile device, a communication device, a game device, a tablet (or tablet computer), a laptop, a still image camera, a video camera, an encoding/decoding chip, a television, a set-top-box, a display, a still image server and a video server (e.g. a broadcast server, a video-on-demand server or a web server).

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing an image or a video or other communication apparatuses. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer; a floppy disk; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a apparatus configured to carry out a process and a apparatus that includes a processor-readable medium (such as a storage apparatus) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

REFERENCES

[1] ETSI TS 103 433-1 v1.2.1 (2017-08), «High-Performance Single Layer High Dynamic Range (HDR) System for use in Consumer Electronics devices; Part 1: Directly Standard Dynamic Range (SDR) Compatible HDR system (SL-HDR1)".

[2] ETSI TS 103 433-2 v1.1.1, «High-Performance Single Layer High Dynamic Range (HDR) System for use in Consumer Electronics devices; Part 2: Enhancements for EPRceptual Quantization (PQ) transfer function based High Dynamic Range (HDR) Systems (SL-HDR-2)".

[3] Rec. ITU-R BT.2100-2 (2018-07), "Image parameter values for high dynamic range television for use in production and international programme exchange"

[4] Report ITU-R BT.2390-4, "High dynamic range television for production and international programme exchange", (04-2018).

[5] CTA-861-G, CTA Standard CTA-861-G, November 2016: "A DTV Profile for Uncompressed High Speed Digital Interfaces".

The invention claimed is:

1. A method for processing a video signal, comprising:
receiving a medium dynamic range video signal and associated metadata, the metadata including data representative of a peak luminance value of the medium dynamic range video signal;
receiving data representative of a peak luminance value of a presentation display;
determining whether the peak luminance value of the medium dynamic range video signal is greater or lower than the peak luminance value of the presentation display;
configuring a processor based on the determination, wherein the processor has a first mode to reconstruct a high dynamic range video signal based on a received standard dynamic range video signal and associated metadata, and a second mode to optimize a received high dynamic range video signal for a rendering device; and
processing the medium dynamic range video signal by the processor in the first mode if the peak luminance value of the medium dynamic range video signal is smaller than the peak luminance value of the presentation display and in the second mode if the peak luminance value of the medium dynamic range video signal is greater than the peak luminance value of the presentation display, wherein a variable included in the metadata has a data value representing the second mode to specify that a high dynamic range video signal has been pre-processed according to the second mode to generate the medium dynamic range video signal.

2. The method according to claim 1, wherein the medium dynamic range video signal is processed in the first mode for up-mapping the medium dynamic range video signal and is processed in the second mode for down-mapping the medium dynamic range video signal.

3. The method according to claim 1, wherein the variable is overwritten with a data value representing the first mode if the peak luminance value of the medium dynamic range video signal is smaller than the peak luminance value of the presentation display.

4. The method according to claim 1, wherein the variable is a part of an SEI message within the received metadata.

5. The method according to claim 1, wherein the processor is configured to process in the first mode a SL-HDR1 signal and in the second mode a SL-HDR2 signal and the variable corresponds to the sl_hdr_mode_value_minus1 syntax element.

6. The method according to claim 1, wherein the processor is adapted to linearize the medium dynamic range video signal in the first mode.

7. The method according to claim 1, wherein in the processing according to the first mode a parameter representing a maximum display mastering luminance of a standard dynamic range mastering display is set to the peak luminance value of the medium dynamic range video signal.

8. The method according to claim 1, wherein the received medium dynamic range video signal is represented as a SL-HDR2 signal and the processor is adapted to process the received medium dynamic signal in the first mode.

9. A processor for processing a video signal, the processor having a first mode to reconstruct a high dynamic range video signal based on a received standard dynamic range video signal and associated metadata, the processor having a second mode to optimize a received high dynamic range video signal for a rendering device, the processor being configured for:
receiving a medium dynamic range video signal and associated metadata, the metadata including data representative of a peak luminance value of the medium dynamic range video signal;
receiving data representative of a peak luminance value of a presentation display;
determining whether the peak luminance value of the medium dynamic range video signal is greater or lower than the peak luminance value of the presentation display; and
processing the medium dynamic range video signal in the first mode if the peak luminance value of the medium dynamic range video signal is smaller than the peak luminance value of the presentation display and in the second mode if the peak luminance value of the medium dynamic range video signal is greater than the peak luminance value of the presentation display, wherein a variable included in the metadata has a data value representing the second mode to specify that a high dynamic range video signal has been pre-processed according to the second mode to generate the medium dynamic range video signal.

10. An apparatus comprising a processor according to claim 9.

11. The apparatus according to claim 10, further comprising an output for providing the processed medium dynamic range video signal to a display device.

12. The apparatus according to claim 10, further comprising a display for displaying the processed medium dynamic range video signal.

13. The processor according to claim 9, wherein the medium dynamic range video signal is processed in the first mode for up-mapping the medium dynamic range video signal and is processed in the second mode for down-mapping the medium dynamic range video signal.

14. The processor according to claim 9, wherein the variable is overwritten with a data value representing the first mode if the peak luminance value of the medium dynamic range video signal is smaller than the peak luminance value of the presentation display.

15. The processor according to claim 9, wherein the variable is a part of an SEI message within the received metadata.

16. The processor according to claim 9, wherein the processor is configured to process in the first mode a SL-HDR1 signal and in the second mode a SL-HDR2 signal and the variable corresponds to the sl_hdr_mode_value_minus1 syntax element.

17. The processor according to claim 9, wherein the received medium dynamic range video signal is represented as a SL-HDR2 signal and the processor is adapted to process the received medium dynamic signal in the first mode.

18. A non-transitory computer-readable medium comprising instructions that cause a computer to process a video signal, the processing comprising:
receiving a medium dynamic range video signal and associated metadata, the metadata including data representative of a peak luminance value of the medium dynamic range video signal;
receiving data representative of a peak luminance value of a presentation display;
determining whether the peak luminance value of the medium dynamic range video signal is greater or lower than the peak luminance value of the presentation display;
configuring a processor based on the determination, wherein the processor has a first mode to reconstruct a high dynamic range video signal based on a received standard dynamic range video signal and associated metadata, and a second mode to optimize a received high dynamic range video signal for a rendering device; and
processing the medium dynamic range video signal by the processor in the first mode if the peak luminance value of the medium dynamic range video signal is smaller than the peak luminance value of the presentation display and in the second mode if the peak luminance value of the medium dynamic range video signal is greater than the peak luminance value of the presentation display, wherein a variable included in the metadata has a data value representing the second mode to specify that a high dynamic range video signal has been pre-processed according to the second mode to generate the medium dynamic range video signal.

19. The non-transitory computer-readable medium according to claim 18, wherein the received medium dynamic range video signal is represented as a SL-HDR2 signal and the processor is adapted to process the received medium dynamic signal in the first mode.

* * * * *